(12) United States Patent
Kuwabara

(10) Patent No.: US 9,038,319 B2
(45) Date of Patent: May 26, 2015

(54) SEAL MEMBER OF AUTOMOBILE DOOR

(71) Applicant: Nishikawa Rubber Co., Ltd., Hiroshima (JP)

(72) Inventor: Hirokazu Kuwabara, Hiroshima (JP)

(73) Assignee: Nishikawa Rubber Co., Ltd., Hiroshima (JP)

( * ) Notice: Subject to any disclaimer, the term of this patent is extended or adjusted under 35 U.S.C. 154(b) by 0 days.

(21) Appl. No.: 13/718,942

(22) Filed: Dec. 18, 2012

(65) Prior Publication Data

US 2013/0160375 A1    Jun. 27, 2013

(30) Foreign Application Priority Data

Dec. 22, 2011 (JP) .................. 2011-282145

(51) Int. Cl.
*B60J 10/00* (2006.01)
*B60J 10/04* (2006.01)
*E06B 7/23* (2006.01)
*B60J 10/06* (2006.01)

(52) U.S. Cl.
CPC ............ *B60J 10/048* (2013.01); *E06B 7/2303* (2013.01); *B60J 10/0005* (2013.01); *B60J 10/0014* (2013.01); *B60J 10/0031* (2013.01); *B60J 10/0062* (2013.01); *B60J 10/06* (2013.01)

(58) Field of Classification Search
CPC . E06B 7/2303; B60J 10/0031; B60J 10/0005; B60J 10/048; B60J 10/062; B60J 10/06
USPC ................ 49/502, 440, 428, 442, 414, 489.1, 49/480.1, 492.1, 498.1
See application file for complete search history.

(56) References Cited

U.S. PATENT DOCUMENTS

| | | | | |
|---|---|---|---|---|
| 5,649,405 A | * | 7/1997 | Morihara et al. | ............ 52/716.1 |
| 6,185,869 B1 | * | 2/2001 | Kawai | .............................. 49/441 |
| 7,854,094 B2 | * | 12/2010 | Zimmer et al. | .................. 49/440 |

(Continued)

FOREIGN PATENT DOCUMENTS

| | | |
|---|---|---|
| DE | 20006771 U1 | 9/2001 |
| EP | 0679547 A1 | 11/1995 |
| GB | 2399852 A | 9/2004 |

(Continued)

OTHER PUBLICATIONS

European Patent Office, Extended European Search Report for Application No. 12197836.5 Feb. 6, 2015, 7 pages, Germany.

*Primary Examiner* — Gregory Strimbu
(74) *Attorney, Agent, or Firm* — Alston & Bird LLP

(57) ABSTRACT

A seal member is provided with a retainer and a weatherstrip held by a pair of engagement parts of the retainer. The weatherstrip has a hollow shape formed by a base and a seal part. The base is configured to be inserted between the pair of engagement parts of the retainer, and the seal part is integral with the base. A center portion of the base has a substantially V cross section, the center portion being configured to come into elastic contact with a portion of the retainer other than each of the pair of engagement parts such that a counterforce is applied from the portion of the retainer other than each of the pair of engagement parts to the center portion of the base when the both sides of the weatherstrip are engaged with the pair of engagement parts.

12 Claims, 2 Drawing Sheets

(56) References Cited

U.S. PATENT DOCUMENTS

| | | |
|---|---|---|
| 2001/0034976 A1 | 11/2001 | Maass |
| 2006/0143988 A1* | 7/2006 | Dillmann .................... 49/498.1 |
| 2008/0172948 A1* | 7/2008 | Shibata et al. ................. 49/440 |
| 2009/0001755 A1* | 1/2009 | Fuetterer ................. 296/146.16 |
| 2010/0170160 A1* | 7/2010 | Albanese et al. ............ 49/489.1 |

FOREIGN PATENT DOCUMENTS

| | | |
|---|---|---|
| JP | 61-030556 U | 2/1986 |
| JP | 61-118854 U | 7/1986 |
| JP | H07237454 A | 9/1995 |
| JP | 2009-262822 A | 11/2009 |

* cited by examiner

SEAL MEMBER OF AUTOMOBILE DOOR

CROSS-REFERENCE TO RELATED APPLICATION

This application claims priority to Japanese Patent Application No. 2011-282145 filed on Dec. 22, 2011, the disclosure of which including the specification, the drawings, and the claims is hereby incorporated by reference in its entirety.

BACKGROUND

The present disclosure relates to seal members of automobiles.

In a sashless door of an automobile, a hollow weatherstrip for sealing a clearance between a door glass and an automobile body is held by a retainer fixed to the automobile body. In general, a structure in which a base of a weatherstrip is inserted between a pair of opposed engagement parts of a retainer is employed. In such a structure, when a door glass comes into contact with a seal part of the weatherstrip, the seal part is bent, causing both side edges of the seal part to be deformed toward the center thereof. This deformation can cause a groove-shaped clearance between the rim of the weatherstrip and the engagement parts of the retainer, where the rim of the weatherstrip was in contact with engagement parts of the retainer before contact of the door glass with the seal part. In addition, while the seal part of the weatherstrip is in contact with an automobile body, this seal part might be separated from the automobile body to form a groove-shaped clearance between the seal part and the automobile body.

Japanese Utility Model Publication No. S61-118854 proposes a measurement for preventing formation of a groove-shaped clearance between a weatherstrip and an engagement part of a retainer. In this measurement, in consideration of formation of a clearance between the weatherstrip and the engagement part of the retainer, a wall covering the outer surface of the side rim of the weatherstrip is provided in the retainer. In this structure, even when the side rim of the weatherstrip is separated to a small extent from the engagement part of the retainer, the wall covering the outer surface of the side rim of the weatherstrip prevents the clearance from being exposed in appearance.

Japanese Utility Model Publication No. S61-30556 also shows a structure in which a base of a weatherstrip has a substantially V shape in cross section such that the center of the base projects toward the cabin in order to easily insert the weatherstrip to a pair of engagement parts of a retainer and prevent the weatherstrip from being easily separated from the retainer. Specifically, when the base is inserted between the engagement parts, the base is deformed such that the angle of the V shape of the base is reduced, thereby enhancing easiness of the insertion. After the insertion, when a separation load is applied to the weatherstrip, the angle of the V shape of the base increases, resulting in that both side rims of the base are engaged with the engagement parts, and the weatherstrip is not easily separated from the retainer.

However, in measurements as proposed in Japanese Utility Model Publication No. S61-118854 for preventing formation of a groove-shaped clearance between a weatherstrip and a retainer or an automobile body, the retainer or the automobile body tends to have a complicated shape. Merely providing the substantially V shape in cross section of the base of the weatherstrip as described in Japanese Utility Model Publication No. S61-30556 prevents separation of the weatherstrip but cannot prevent formation of the groove-shaped clearance.

To prevent formation of the groove-shaped clearance, the following measurement has been conventionally employed. Specifically, part of the weatherstrip to be in contact with the door glass and the direction and degree of elastic deformation of the weatherstrip when the weatherstrip comes into contact with the door glass are previously expected, and the weatherstrip is designed such that the side rim overlaps the retainer or the automobile body so as not to form the groove-shaped clearance described above.

However, it is difficult to expect the deformation degree and other conditions of parts of the weatherstrip. Even if the deformation degree and other conditions can be accurately expected to some extent, small dimensional errors between the weatherstrip and the retainer or the automobile body in the final product might cause a groove-shaped clearance. Thus, it is difficult to prevent formation of the groove-shaped clearance by expecting conditions of deformation. In addition, the overlap of the side rim of the weatherstrip causes redundancy of the peripheral length of the hollow shape in cross section of the weatherstrip. Accordingly, unexpected deformation might occur when the weatherstrip is attached to the automobile body.

SUMMARY

It is therefore an object of the present disclosure to prevent formation of a groove-shaped clearance without providing a wall as described above in a retainer or other parts.

To solve the problems described above, the present disclosure provides a structure in which a weatherstrip attached to a retainer is subjected to a force which reduces formation of a the groove-shaped clearance. This structure will be specifically described hereinafter.

In an aspect of the present disclosure, a seal member of an automobile door for sealing a clearance between a door glass of a sashless door and an automobile body includes: a retainer fixed to the automobile body; and a weatherstrip held by the retainer. The retainer includes a pair of engagement parts configured to be engaged with both sides of the weatherstrip. The weatherstrip has a hollow shape formed by a base configured to be inserted between the pair of engagement parts of the retainer and a seal part integrally provided with the base and configured to come into contact with a surface of the door glass facing a cabin. A center portion of the base has a substantially V shape in cross section projecting toward the retainer, and is configured to come into elastic contact with the retainer to be subjected to a counterforce. The counterforce causes both side rims of the weatherstrip to be pressed against the automobile body or side rims of the retainer with the base interposed therebetween.

With this configuration, the center portion of the base of the weatherstrip having the substantially V shape in cross section comes in elastic contact with the retainer to be subjected to a counterforce. This counterforce causes both side rims of the weatherstrip to be pressed against the automobile body or the retainer with the base interposed therebetween. Specifically, the counterforce applies a turning force to both sides of the base sandwiching the center portion thereof using the engagement parts of the retainer as fulcrums. This turning force causes both side rims of the weatherstrip to be pressed against the automobile body or the side rims of the retainer.

Accordingly, even when the seal part of the weatherstrip is bent by contact with the door glass, the turning force reduces movement of both side rims of the weatherstrip toward the center thereof, thereby reducing formation of a groove-shaped clearance between the weatherstrip and the side rims of the retainer or the automobile body.

In a preferred aspect of the present disclosure, the weatherstrip has a partition connecting a portion of the base near the center portion and the seal part such that the hollow shape is divided into two parts. In this aspect, when the door glass comes in contact with the seal part, the partition serves as a resistance, and reduces a high degree of bend of the entire seal part. That is, the partition reduces movement of both side rims of the weatherstrip toward the center thereof, thereby reducing formation of a groove-shaped clearance. In addition, since a load applied from the door glass to the partition is transmitted from the partition to a portion near the center of the base, the base is not locally deformed by bulging toward the cabin. Thus, the pressing load described above from the base is not lessened.

In a preferred aspect of the present disclosure, the base has a flexural rigidity higher than that of the seal part. In this aspect, the base can receive a counterforce from the retainer without fail, while maintaining a flexible contact between the seal part and the door glass. Thus, formation of the groove-shaped clearance can be reduced.

In a preferred aspect of the present disclosure, at least ⅔ in a length of a portion of the base extending from the center portion to each of the pair of engagement parts of the retainer except a tip of the center portion projecting toward the retainer is made of a high-rigidity material which is rubber or a rubber-like elastic material containing a resin. This structure can provide a flexural rigidity of the base. The tip of the center portion may be made of a low-rigidity material which is more flexible than the high-rigidity material. Then, the center portion of the base does not easily shift on the wall surface of the retainer. Even if the center portion of the base shifts by vibration during running of an automobile, abrasion noise is small.

In a preferred aspect of the present disclosure, a side of the weatherstrip is provided with a contact part configured to come into contact with an outer surface of one of the pair of engagement parts of the retainer facing the door glass. This structure can reduce formation of a groove-shaped clearance due to separation of the contact part from the engagement part.

In a preferred aspect of the present disclosure, another side of the weatherstrip is provided with a contact part configured to come into contact with an end surface of the automobile body facing the door glass. This structure can reduce formation of a groove-shaped clearance due to separation of the contact part from the engagement part.

DETAILED DESCRIPTION

Embodiments of the present disclosure will be described hereinafter with reference to the drawings. The following embodiments are merely preferred examples in nature, and are not intended to limit the scope, applications, and use of the invention.

Figure 1:
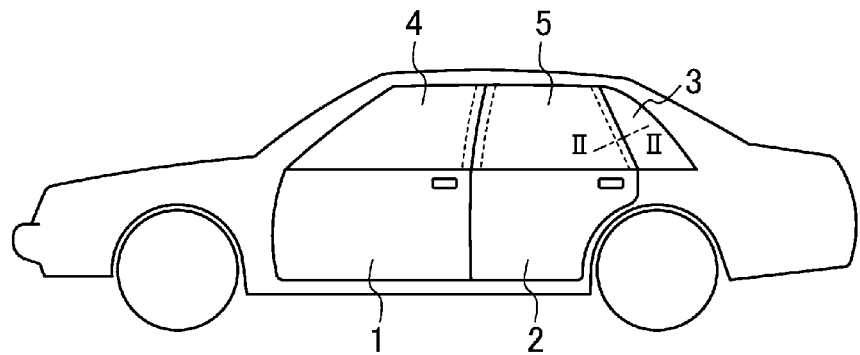
FIG. 1 is a side view illustrating an example of an automobile to which embodiments of the present disclosure are applied.

In an automobile illustrated in FIG. 1, reference character 1 denotes a front door, reference character 2 denotes a rear door, and reference character 3 denotes a quarter glass. The front door 1 and the rear door 2 are sashless doors, and include sliding door glasses 4 and 5, respectively. A seal member according to this embodiment is provided in the periphery of the opening of a cabin which is opened or closed with the rear door 2 of this automobile. The quarter glass 3 is not necessarily made of glass, and may be a metal or resin panel.

Figure 2:
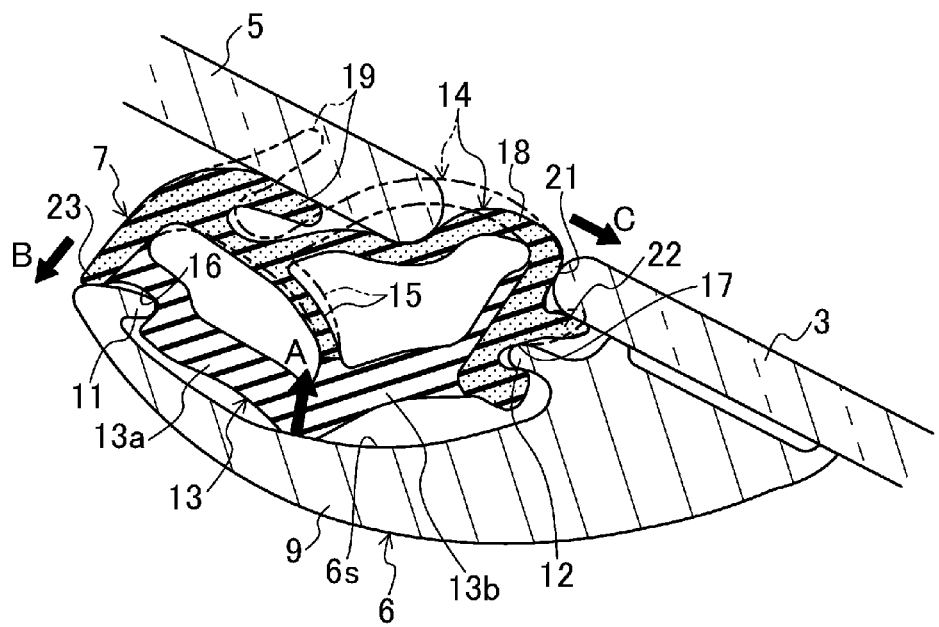
FIG. 2 is a cross-sectional view (taken along the line II-II in FIG. 1) illustrating a seal member of an automobile door according to an embodiment of the present disclosure.

As illustrated in FIG. 2, to seal a clearance between the door glass 5 of the rear door 2 and the quarter glass 3 as the automobile body, the seal member includes a retainer 6 fixed to the quarter glass 3 and a weatherstrip 7 held by the retainer 6. The retainer 6 is made of a metal or plastics. The weatherstrip 7 is made of an elastic material.

The retainer 6 is designed such that the base thereof is fixed to the inner surface (the surface facing the cabin) of the front edge of the quarter glass 3 and projects from the quarter glass 3 toward the rear door 2 inside the cabin to form a projection part 9. A pair of engagement parts 11 and 12 to be engaged with both sides of the weatherstrip 7 is provided at the outdoor side of the projection part 9 of the retainer 6. The engagement part 11 is located at the distal end of the projection part 9, and projects toward the center of the projection part 9. The engagement part 12 is located the proximal end of the projection part 9, and projects toward the center of the projection part 9. The engagement parts 11 and 12 extend in the longitudinal direction of the retainer 6. The wall surface of the retainer 6 between the engagement parts 11 and 12 has an arc shape which bulges toward the cabin. Specifically, the wall surface has a surface 6s facing the weatherstrip 7. The surface 6s also bulges toward the cabin, and is bent in the direction away from the weatherstrip 7 when viewed from the weatherstrip 7.

Figure 3:
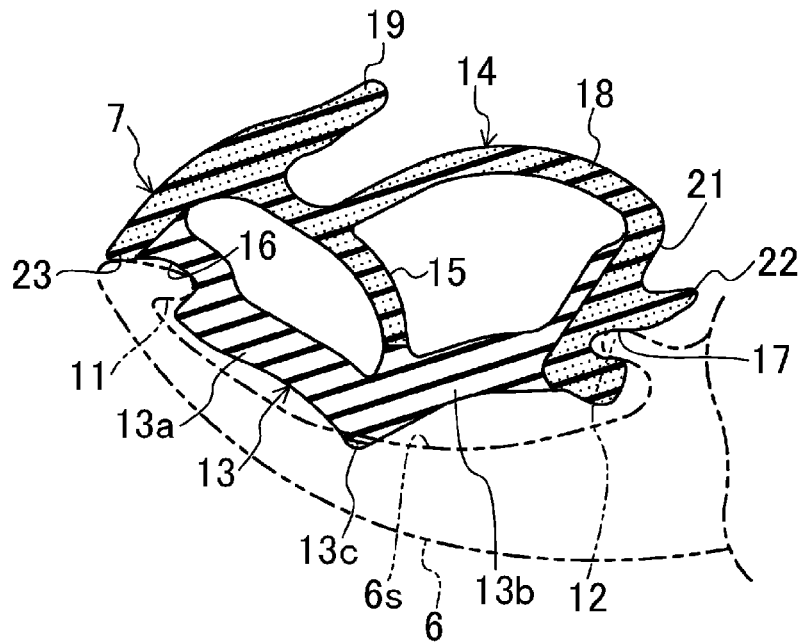
FIG. 3 is a cross-sectional view illustrating a state before a weatherstrip according to the present disclosure is attached to a retainer.

FIG. 3 illustrates the shape of the weatherstrip 7 in a free state (i.e., before the weatherstrip 7 is attached to the retainer 6). The weatherstrip 7 includes a base 13 configured to be fitted between the engagement parts 11 and 12 of the retainer 6 and a seal part 14 integrally provided with the base 13 and configured to come into contact with the surface of the door glass 5 of the rear door 2 facing the cabin. The base 13 and the seal part 14 form a hollow shape. The weatherstrip 7 has a partition 15 connecting a portion of the base 13 near the center thereof and the seal part 14 to divide the hollow shape into two parts.

The base 13 includes two connected base walls 13a and 13b forming a V shape in cross section. The center of the V shape projects toward the retainer 6. Each of the base walls 13a and 13b is bent such that the center thereof projects in the direction away from the retainer 6. Engagement grooves 16 and 17 configured to be engaged with the engagement parts 11 and 12 of the retainer 6 are provided at both sides of the base 13. The engagement grooves 16 and 17 are open at both sides of the weatherstrip 7 toward the outside, and extend in the longitudinal direction of the weatherstrip 7.

On the other hand, the seal part 14 includes: an bulge 18 extending outward from the partition 15 toward the quarter glass 3; and a sealing lip 19 at the side opposite to the bulge 18 relative to the partition 15 (i.e., at the side closer to the rear door 2 than the bulge 18).

The bulge 18 fills a clearance between the door glass 5 of the rear door 2 and the quarter glass 3 from the side facing the cabin. The side surface of the bulge 18 facing the quarter glass 3 includes: a contact part 21 configured to come into contact with the end surface of the quarter glass 3 facing the rear door 2; and a lip 22 configured to come into contact with the inner surface of the quarter glass 3. As illustrated in FIG. 2, the bulge 18 bends toward the cabin when the bulge 18 comes into contact with the door glass 5 of the rear door 2, and fills the clearance between the door glass 5 and the quarter glass 3.

The sealing lip 19 projects from the rear door 2 toward the bulge 18, and is configured to come into contact with the inner surface of the door glass 5. A contact part 23 configured to come into contact with the outer surface of the engagement part 11 of the retainer 6 is provided at the side rim of the seal part 14 facing the rear door 2.

Materials for the weatherstrip 7 will now be described. The weatherstrip 7 of this embodiment is made of rubber or a rubber-like elastic material containing a resin, and is integrally formed by a high-rigidity material of a solid material without bubbles or a sponge material with bubbles having a specific gravity greater than or equal to about 0.6 and less than or equal to about 1.3 and a low-rigidity material of a solid material with a rigidity lower than that of the high-rigidity material or a sponge material with bubbles having a specific gravity of greater than or equal to or about 0.4 and less than about 0.8. Examples of the rubber mentioned above include EPDM rubber, natural rubber, and isoprene rubber. Examples of the resin mentioned above include olefin-based TPO and styrene-based TPS, which are thermoplastic elastomers. Any type of rubber and thermoplastic elastomers may be employed as long as they are rubber-like elastic materials.

At least $2/3$ in the length of each of the base walls 13a and 13b of the base 13 from the center of the base 13 to an associated one of the engagement parts 11 and 12 of the retainer 6 is made of the high-rigidity material. Specifically, the base 13 is made of the high-rigidity material, except for a tip 13c projecting toward the cabin at the center of the base 13 and a side rim provided with an engagement groove 17 facing the quarter glass 3. The tip 13c and the side rim provided with the engagement groove 17 are made of the low-rigidity material.

In this embodiment, the base wall 13a extending from the center of the base 13 to the engagement part 11 of the retainer 6 including the engagement groove 16 is made of the high-rigidity material. Accordingly, a portion of the base wall 13a covering the outer surface of the engagement part 11 is also made of the high-rigidity material. A portion of the base wall 13b extending from the center of the base 13 to a portion near the engagement groove 17 is made of the high-rigidity material.

The bulge 18, the sealing lip 19, the contact part 21, the lip 22, and the contact part 23 of the seal part 14 are made of the low-rigidity material. The partition 15 is also made of the low-rigidity material.

Although the rim of the base 13 provided with the engagement groove 17 and the contact part 21 and the lip 22 of the seal part 14 facing the quarter glass 3 are made of the low-rigidity material, a portion of the seal part 14 extending from the back of the side rim to the back of the contact part 21 is made of the high-rigidity material continuously extending from the base wall 13b of the base 13.

In the free state illustrated in FIG. 3, the positional relationship between the engagement grooves 16 and 17 of the base 13 and the tip 13c at the center of the base 13 is determined such that when the engagement grooves 16 and 17 of the base 13 are engaged with the engagement parts 11 and 12 of the retainer 6, the tip 13c interferes with the surface 6s of the retainer 6 facing the weatherstrip 7.

The base 13 is thicker (has a thickness larger) than the seal part 14, and in addition, a large part of the base 13 is made of the high-rigidity material as described above. Thus, the base 13 has a flexural rigidity higher than that of the seal part 14.

Accordingly, in the assembled state illustrated in FIG. 2, the center of the base 13 is in elastic contact with the retainer 6, thereby applying a counterforce A from the retainer 6 to the center of the base 13. This counterforce A causes a state in which a turning force is applied to the base walls 13a and 13b using the engagement parts 11 and 12 of the retainer 6 as fulcrums.

Specifically, a force causing the tip of the base wall 13a to turn toward the cabin about the tip of the engagement part 11 is applied to the base wall 13a engaged with the engagement part 11 of the retainer 6. Accordingly, the contact part 23 of the seal part 14 is pressed against the outer surface of the engagement part 11 as indicated by the arrow B. In this case, since a portion of the base wall 13a covering the engagement part 11 is made of the high-rigidity material, the turning force is easily applied from the base wall 13a to the contact part 23 of the seal part 14, thereby increasing a force causing the contact part 23 to be pressed against the engagement part 11.

A force causing the tip of the base wall 13b to turn toward the cabin about the tip of the engagement part 12 is also applied to the base wall 13b engaged with the engagement part 12 of the retainer 6. Accordingly, the contact part 21 of the seal part 14 is pressed against the end surface of the quarter glass 3 as indicated by the arrow C. In this case, since the back of the contact part 21 of the seal part 14 is made of the high-rigidity material extending from the base wall 13b, the turning force is easily applied from the base wall 13b to the contact part 21 of the seal part 14, thereby increasing a force causing the contact part 21 to be pressed against the quarter glass 3.

Thus, as illustrated in FIG. 2, even when the door glass 5 of the rear door 2 comes into contact with the seal part 14 of the weatherstrip 7 to bend the seal part 14, the turning force can reduce movement of both side rims of the weatherstrip 7 toward the center thereof. That is, it is possible to reduce formation of groove-shaped clearances between the contact part 21 of the seal part 14 and the quarter glass 3 and between the contact part 23 and the engagement part 11 of the retainer 6.

In addition, it is also possible to reduce a high degree of bend of the entire seal part 14 caused by the partition 15 as a resistance when the door glass 5 comes into contact with the bulge 18 of the seal part 14. Specifically, the partition 15 reduces movement of the contact parts 21 and 23 of the seal part 14 toward the center thereof, thereby reducing formation of a groove-shaped clearance. Further, a load applied from the door glass 5 to the partition 15 is transmitted from the partition 15 to a portion near the center of the base 13. Accordingly, the base wall 13a or 13b is not locally deformed by bulging toward the cabin, and thus, the pressing load described above from the base 13 is not lessened.

Furthermore, since the tip 13c at the center of the base 13 is made of the low-rigidity material, the tip 13c does not easily shift on the wall surface of the retainer 6. Even when the tip 13c shifts by vibration during running of the automobile, abrasion noise due to the running is small. In particular, if the low-rigidity material is a sponge material, this advantage is further enhanced.

Figure 4:
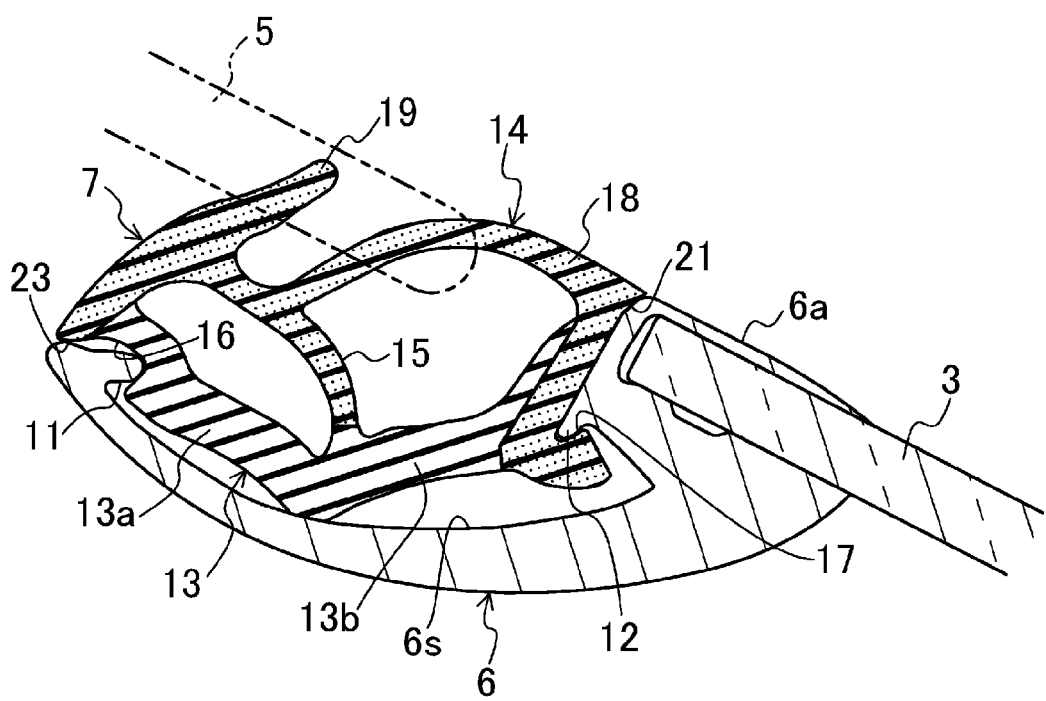
FIG. 4 is a cross-sectional view illustrating a seal member of an automobile door according to another embodiment of the present disclosure.

FIG. 4 illustrates another embodiment of the present disclosure. This embodiment is different from the above embodiment in the structure of attachment of a retainer 6 to a quarter glass 3. Specifically, in this another embodiment, a base 6a of the retainer 6 has a U shape in cross section, and is fitted to the rear door side of the quarter glass 3. Accordingly, a contact part 21 of a weatherstrip 7 facing the quarter glass 3 is in contact with not the quarter glass 3 but the base 6a of the retainer 6. The other configuration is the same as that of the above embodiment. Thus, in this another embodiment, an elastic contact of the center of the base 13 with the retainer 6 also applies a turning force to base walls 13a and 13b. This turning force causes contact parts 21 and 23 of a seal part 14 to be pressed against the engagement part 21 and the base 6a of the retainer 6. Accordingly, when the door glass 5 comes into contact with the seal part 14, no groove-shaped clearances are formed.

In the foregoing embodiments, the base 13 of the weatherstrip 7 is mainly made of solid rubber as a high-rigidity material, and the seal part 14 is made of sponge rubber as a low-rigidity material. Alternatively, the entire weatherstrip 7 may be made of one of solid rubber or sponge rubber.

The present disclosure is applicable not only to the rear doors 2 of the above embodiments, but also to seal members of the front doors 1 and further to two-door automobiles. The quarter glass 3 may be a metal or resin panel instead of a glass panel.

What is claimed is:

1. A seal member for an automobile sashless door, the seal member being configured to seal a clearance between a door glass of the sashless door and an automobile body, the seal member comprising:
    a retainer fixed to the automobile body; and
    a weatherstrip,
    wherein:
    the retainer includes a pair of engagement parts which engage and hold two sides of the weatherstrip;
    the weatherstrip has a hollow shape formed by a base and a seal part, the base inserted between the pair of engagement parts of the retainer, the seal part being integral with the base and adapted to contact at least one surface of the door glass;
    a center portion of the base has a substantially V shape in cross section and projects toward the retainer, the center portion being configured to come into contact with a portion of the retainer other than the pair of engagement parts such that a counterforce is applied by the portion of the retainer other than the pair of engagement parts to the center portion of the base when said sides of the weatherstrip are engaged with the pair of engagement parts;
    the counterforce is applied as turning forces to said sides of the weather strip using the pair of engagement parts of the retainer as fulcrums;
    a first contact portion of the weatherstrip located lateral to a first one of the pair of engagement parts of the retainer is pushed in a first direction against a side rim of the retainer by a first one of the turning forces; and
    a second contact portion of the weatherstrip located lateral to a second one of the pair of engagement parts of the retainer is pushed in a second direction against a portion of the automobile body by a second one of the turning forces, the second direction being substantially perpendicular relative to the first direction.

2. The seal member of claim 1, wherein the weatherstrip has a partition connecting a portion of the base near the center portion and the seal part such that the hollow shape is divided into two parts.

3. The seal member of claim 2, wherein the base has a flexural rigidity higher than a flexural rigidity of the seal part.

4. The seal member of claim 3, wherein:
    at least a part of the base except a tip of the center portion projecting toward the retainer is made of a material which is at least one of an elastic material containing a resin or rubber; and
    said part of the base has a rigidity greater than a rigidity of the tip of the center portion.

5. The seal member of claim 1, wherein the base has a flexural rigidity higher than a flexural rigidity of the seal part.

6. The seal member of claim 5, wherein:
    at least a part of the base except a tip of the center portion projecting toward the retainer is made of a material which is at least one of an elastic material containing a resin or rubber; and
    the part of the base has a rigidity greater than a rigidity of the tip of the center portion.

7. The seal member of claim 1, wherein:
    the side rim of the retainer is an outer surface of the retainer which is adapted to face the door glass; and
    the portion of the automobile body is an end surface of the automobile body which is adapted to face the door glass.

8. The seal member of claim 7, wherein the weatherstrip has a partition connecting a portion of the base near the center portion and the seal part such that the hollow shape is divided into two parts.

9. The seal member of claim 8, wherein the base has a flexural rigidity higher than a flexural rigidity of the seal part.

10. The seal member of claim 9, wherein:
    at least a part of the base except a tip of the center portion projecting toward the retainer is made of at least one of an elastic material containing a resin or rubber; and
    the part of the base has a rigidity greater than a rigidity of the tip of the center portion.

11. The seal member of claim 7, wherein the base has a flexural rigidity higher than a flexural rigidity of the seal part.

12. The seal member of claim 11, wherein:
    at least a part of the base except a tip of the center portion projecting toward the retainer is made of at least one of an elastic material containing a resin or rubber; and
    the part of the base has a rigidity greater than a rigidity of the tip of the center portion.

* * * * *